(12) United States Patent
Zhang et al.

(10) Patent No.: US 11,914,241 B1
(45) Date of Patent: Feb. 27, 2024

(54) HIGH-BRIGHTNESS LIQUID CRYSTAL DISPLAY DEVICE

(71) Applicant: Keewin Display Co., Ltd., Shanghai (CN)

(72) Inventors: Qianzhong Zhang, Shanghai (CN); Wen Li, Shanghai (CN); Feng Zhou, Shanghai (CN)

(73) Assignee: Keewin Display Co., Ltd., Shanghai (CN)

( * ) Notice: Subject to any disclaimer, the term of this patent is extended or adjusted under 35 U.S.C. 154(b) by 0 days.

(21) Appl. No.: 18/325,047

(22) Filed: May 29, 2023

(30) Foreign Application Priority Data

May 11, 2023 (CN) .......................... 202321135986.4

(51) Int. Cl.
*G02F 1/1333* (2006.01)

(52) U.S. Cl.
CPC .............................. *G02F 1/133385* (2013.01)

(58) Field of Classification Search
CPC ................................................ G02F 1/133385
See application file for complete search history.

(56) References Cited

U.S. PATENT DOCUMENTS

| | | | | |
|---|---|---|---|---|
| 7,697,289 B1* | 4/2010 | Liao | ................... | H05K 7/20972 345/905 |
| 8,351,014 B2* | 1/2013 | Dunn | ................. | H05K 7/20972 349/161 |
| 8,823,916 B2* | 9/2014 | Hubbard | ............ | H05K 7/20972 165/104.34 |
| 9,470,924 B2* | 10/2016 | Dunn | ................. | H05K 7/20972 |
| 10,334,764 B2* | 6/2019 | Kang | ................... | H05K 5/0213 |
| 10,905,035 B2* | 1/2021 | Whitehead | ............ | F28D 9/0037 |
| 2012/0044217 A1* | 2/2012 | Okada | ............... | G02F 1/133382 345/204 |
| 2013/0170140 A1* | 7/2013 | Dunn | ................. | H05K 7/20145 313/46 |
| 2018/0136730 A1* | 5/2018 | Hayashi | ................. | G06F 3/165 |
| 2020/0275585 A1* | 8/2020 | Dunn | ................. | H05K 7/20972 |
| 2021/0307214 A1* | 9/2021 | Zhang | ................ | H05K 7/20172 |
| 2021/0345528 A1* | 11/2021 | Dunn | ................. | H05K 7/20972 |
| 2023/0209786 A1* | 6/2023 | Dunn | ................. | H05K 7/20972 361/679.02 |

* cited by examiner

*Primary Examiner* — Donald L Raleigh
(74) *Attorney, Agent, or Firm* — Wang Law Firm, Inc.

(57) ABSTRACT

A high-brightness liquid crystal display device includes a display module; a temperature controller abutting a back surface of the display module, a first ventilation channel being formed in the temperature controller; and fans disposed on the display module in correspondence to the first ventilation channel of the temperature controller. The fans form an airflow that flows through the first ventilation channel, to adjust the temperature of the display module. According to the present invention, the temperature controller abuts the back surface of the display module to implement temperature control on the back surface of the display module. The back surface of the display module is a lamp panel, and the temperature controller abuts the lamp panel. The airflow formed by the fans quickly reduces and increases the temperature of the lamp panel, thereby ensuring that the lamp panel works at an appropriate environmental temperature.

10 Claims, 5 Drawing Sheets

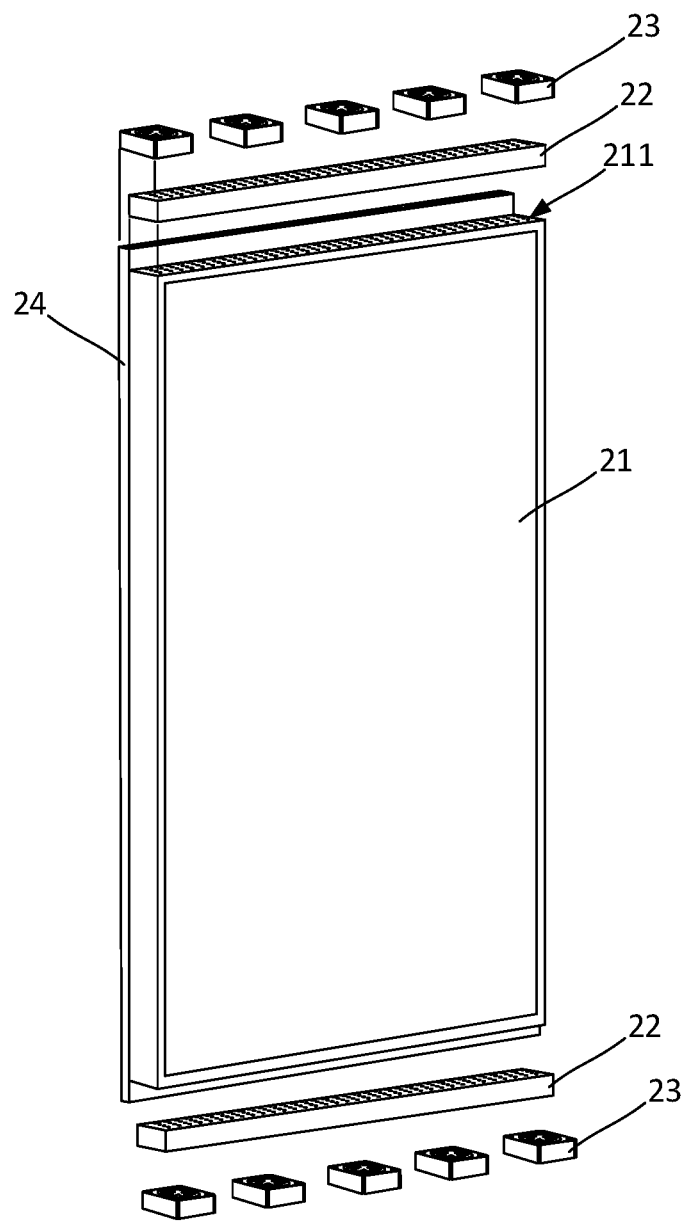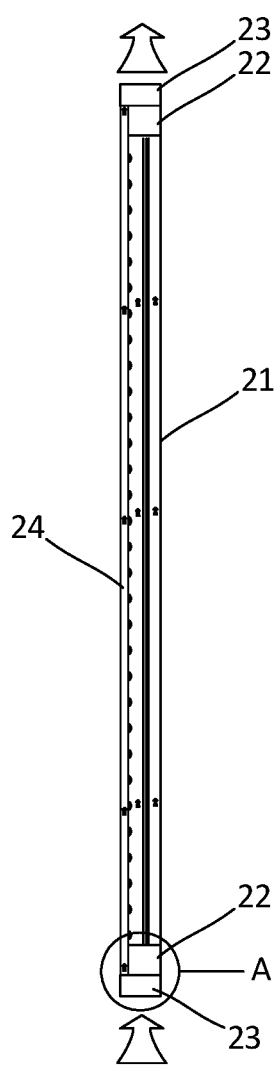
FIG. 1
FIG. 2

HIGH-BRIGHTNESS LIQUID CRYSTAL DISPLAY DEVICE

TECHNICAL FIELD

The present invention relates to the field of display device technologies, and in particular, to a high-brightness liquid crystal display device.

BACKGROUND

A high-brightness liquid crystal display module is widely used outdoors. Due to a large amount of heat generated by the high-brightness liquid crystal display plus heat generated by sunlight, there may be high heat after the high-brightness liquid crystal display module works for a period of time. As a result, the high-brightness liquid crystal display module has poor display effect, and even cannot be used normally. In addition, in cold areas, an outdoor temperature is extremely low, which easily disables the display module to operate normally. Therefore, it is particularly necessary to perform constant temperature control on the outdoor display module.

SUMMARY

An objective of the present invention is to overcome the shortcomings of the prior art and provide a high-brightness liquid crystal display device, to solve the problem in the prior art that display effect is affected by diaphragm vibration caused by blowing air into a display module with a fan.

To achieve the foregoing objective, the following technical solutions are used.

The present invention provides a high-brightness liquid crystal display device, including:
   a display module;
   a temperature controller abutting a back surface of the display module, a first ventilation channel being formed in the temperature controller; and
   fans disposed on the display module in correspondence to the first ventilation channel of the temperature controller, the fans forming an airflow that flows through the first ventilation channel, to adjust the temperature of the display module.

According to the present invention, the temperature controller abuts the back surface of the display module to implement temperature control on the back surface of the display module. The back surface of the display module is a lamp panel, and the temperature controller abuts the lamp panel. The airflow formed by the fans quickly reduces and increases the temperature of the lamp panel, thereby ensuring that the lamp panel works at an appropriate environmental temperature.

As a further improvement of the high-brightness liquid crystal display device of the present invention, ventilation openings communicated with an interior of the display module are formed on two opposite sides of the display module.

The display device further includes air distributing boxes disposed in correspondence to the ventilation openings. The air distributing box is connected to a side portion of the display module. An air duct is formed inside the air distributing box.

The fan is also disposed in correspondence to the air distributing box. The fan forms an airflow that flows through the interior of the display module.

As a further improvement of the high-brightness liquid crystal display device of the present invention, a second ventilation channel close to the back surface and a third ventilation channel close to a front surface are formed in the display module.

The second ventilation channel and the third ventilation channel are both communicated with the ventilation openings.

As a further improvement of the high-brightness liquid crystal display device of the present invention, a diffuser plate is disposed on the air distributing box. The diffuser plate is disposed at the ventilation channel in a blocking manner. A plurality of communicating openings are formed on the diffuser plate.

As a further improvement of the high-brightness liquid crystal display device of the present invention, a partition plate is disposed in the air distributing box. The air duct is partitioned by the partition plate to form sub air ducts correspondingly communicated with the second ventilation channel and the third ventilation channel.

As a further improvement of the high-brightness liquid crystal display device of the present invention, the diffuser plate is disposed on the air distributing box. The diffuser plate is disposed at the sub air duct in a blocking manner. A plurality of communicating openings communicated with the second ventilation channel and/or the third ventilation channel are formed on the diffuser plate.

As a further improvement of the high-brightness liquid crystal display device of the present invention, a static pressure cavity is formed in the air distributing box.

The airflow formed by the fan flows through the static pressure cavity, and then flows into the air duct.

As a further improvement of the high-brightness liquid crystal display device of the present invention, the air distributing box is also disposed at a side portion corresponding to the temperature controller. The air duct in the air distributing box is communicated with the first ventilation channel of the temperature controller.

As a further improvement of the high-brightness liquid crystal display device of the present invention, a side portion of the temperature controller corresponding to a direction in which the first ventilation channel is formed protrudes from the display module to form a protruding section.

The air distributing box abuts the protruding section.

As a further improvement of the high-brightness liquid crystal display device of the present invention, the display device further includes a thermostatic structure. The thermostatic structure and the display module are packaged in a closed shell.

A plurality of thermostatic channels are formed in the thermostatic structure. The thermostatic structure implements temperature increase or temperature reduction treatment on an airflow that flows through the thermostatic channel.

BRIEF DESCRIPTION OF THE DRAWINGS

FIG. 1 is an exploded schematic structural diagram of a high-brightness liquid crystal display device according to a first embodiment of the present invention;

FIG. 2 is a side view of the high-brightness liquid crystal display device according to the first embodiment of the present invention;

DETAILED DESCRIPTION

The following further describes the present invention with reference to the accompanying drawings and specific embodiments.

Referring to FIG. 1, the present invention provides a high-brightness liquid crystal display device, to solve the problems that display effect is affected by high heat caused by heat generated by a high-brightness liquid crystal display module used outdoors and sunlight, the high-brightness liquid crystal display module cannot work in an environment at an extremely low temperature, and the like, and improve applicability of the high-brightness liquid crystal display module in an outdoor environment. According to the present invention, a temperature controller is disposed on a back surface of a display module to quickly implement temperature increase or temperature reduction treatment on the back surface of the display module through a formed first ventilation channel, thereby ensuring that the display module works at an appropriate environmental temperature and ensuring the display effect. The following describes the high-brightness liquid crystal display device of the present invention with reference to the accompanying drawings.

Refer to FIG. 1, which shows an exploded schematic structural diagram of the high-brightness liquid crystal display device according to a first embodiment of the present invention. Refer to FIG. 2, which shows a side view of the high-brightness liquid crystal display device according to the first embodiment of the present invention. The following describes the high-brightness liquid crystal display device of the present invention with reference to FIG. 1 and FIG. 2.

As shown in FIG. 1 and FIG. 2, the high-brightness liquid crystal display device of the present invention includes a display module 21, a temperature controller 24, and fans 23.

Figure 3:
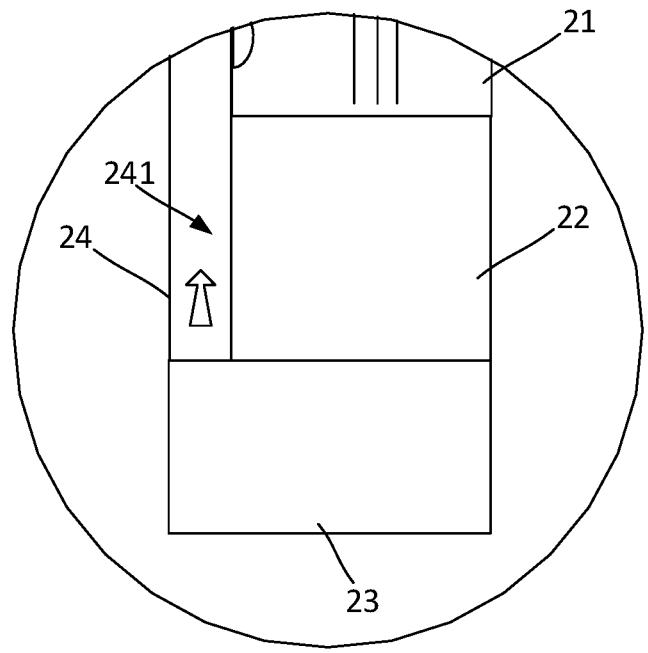
FIG. 3 is a partial enlarged view of part A in FIG. 2.

As shown in FIG. 3, a first ventilation channel 241 is formed in the temperature controller 24. The temperature controller 23 abuts a back surface of the display module 21. The fans 23 are disposed on the display module 21 in correspondence to the first ventilation channel 241 of the temperature controller 24. The fans 23 form an airflow that flows through the first ventilation channel 241, to adjust the temperature of the display module 21.

The fans 23 form the airflow that flows through the first ventilation channel 241. Through the airflow, cooling (temperature reduction treatment) or heating (temperature increase treatment) may be implemented on the back surface of the display module 21. When the temperature of the airflow formed by the fans 23 is lower than that of the back surface of the display module 21, the airflow may cool the back surface of the display module 21. When the temperature of the airflow formed by the fans 23 is higher than that of the back surface of the display module 21, the airflow may heat the back surface of the display module 21. When the outdoor temperature is high, the display module is required to be cooled. At this time, the fan 23 may bring external air or low-temperature air into the first ventilation channel 241 to form the airflow to take away heat on the back surface of the display module. In this way, the display module is cooled. When the outdoor temperature is low, the low temperature affects normal operation of the display module. At this time, the fan 23 may bring high-temperature air into the first ventilation channel 241 to form the airflow to increase a temperature inside the display module. In this way, the display module is heated, and the display module 21 may work at an appropriate environmental temperature. That the outdoor temperature is high may be considered as that the temperature is over 35° C. That the outdoor temperature is low may be considered as that the temperature is below 0° C.

Figure 11:
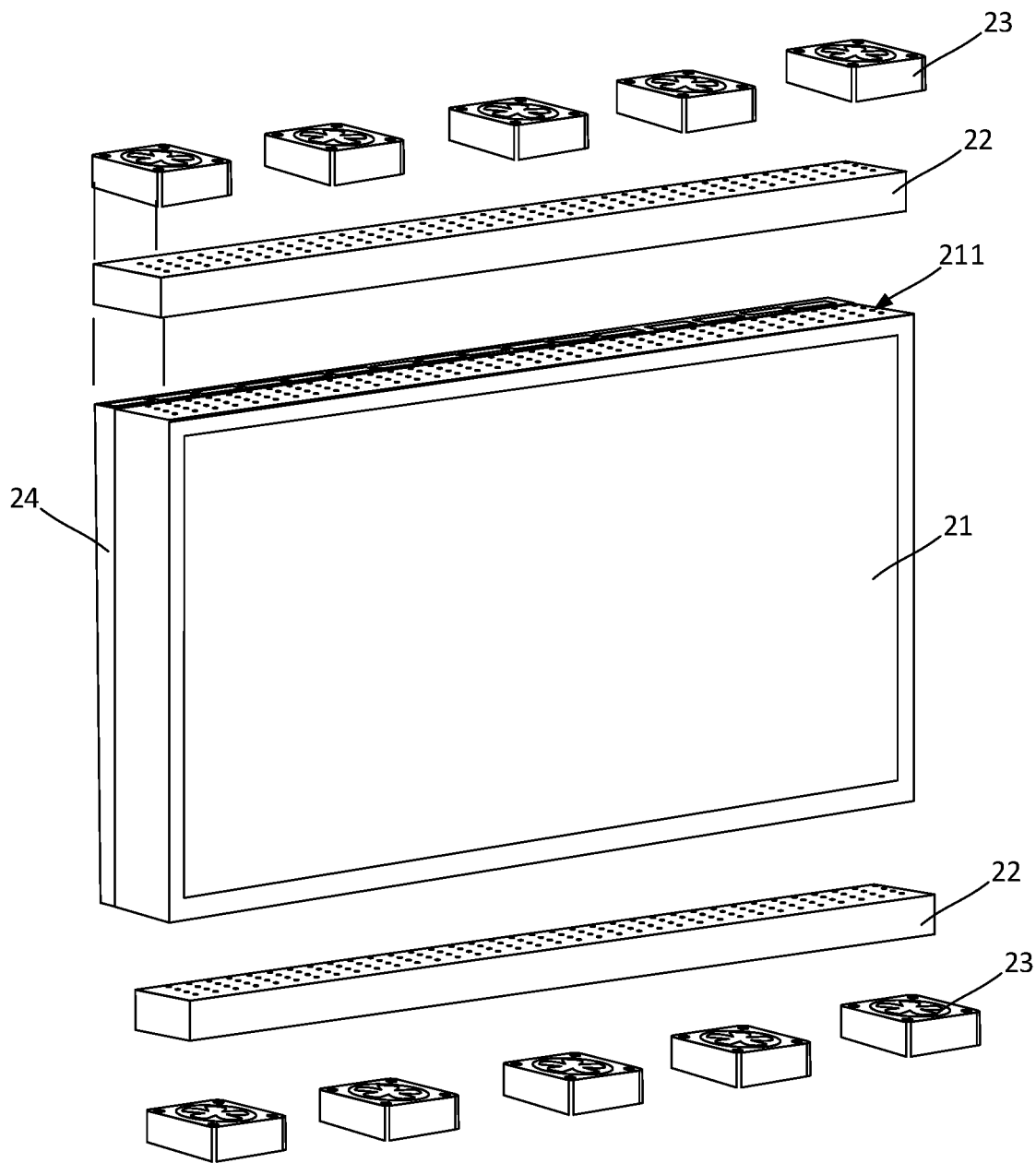
FIG. 11 is an exploded schematic structural diagram of the high-brightness liquid crystal display device according to the second embodiment of the present invention.

In a specific embodiment of the present invention, as shown in FIG. 11, the temperature controller 24 is consistent with the display module 21 in size, and abuts the back surface of the display module 21. The fans 23 are disposed in correspondence to openings of the first ventilation channel. When the first ventilation channel is formed vertically, the fans 23 are disposed on upper and lower sides of the display module 21, the fans 23 are disposed in correspondence to upper and lower sides of the temperature controller 24, and the fans 23 may form the airflow that flows through the first ventilation channel. When the first ventilation channel is formed transversely, the fans 23 are disposed on left and right sides of the display module 21, and the fans 23 may form the airflow that flows through the first ventilation channel.

In a specific embodiment of the present invention, as shown in FIG. 1 and FIG. 2, ventilation openings 211 communicated with the interior of the display module are formed on two opposite sides of the display module 21. The display device further includes air distributing boxes 22 corresponding to the ventilation openings 211. The air distributing box 22 is connected to a side portion of the display module 21. An air duct is formed inside the air distributing box 22. The fan 23 is also disposed in correspondence to the air distributing box 22. The fan 23 forms an airflow that flows through the interior of the display module 21. With the air distributing box 22, the airflow formed by the fan 23 may slow down in the air distributing box, then uniformly flows to the ventilation opening 211 of the display module 21, and then enter the display module 21. In this way, influence of the airflow on a diaphragm in the display module may be effectively reduced, a probability of vibration of the diaphragm may be reduced, and influence on the display effect may be reduced.

In a specific embodiment of the present invention, as shown in FIG. 1 and FIG. 2, a second ventilation channel close to the back surface and a third ventilation channel close to a front surface are formed in the display module 21. The second ventilation channel and the third ventilation channel are both communicated with the ventilation openings 211.

Figure 4:
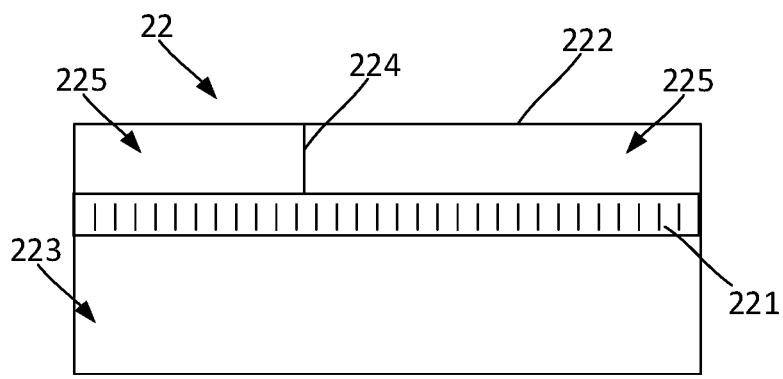
FIG. 4 is a sectional view of an air distributing box in the high-brightness liquid crystal display device according to the present invention.
Figure 5:
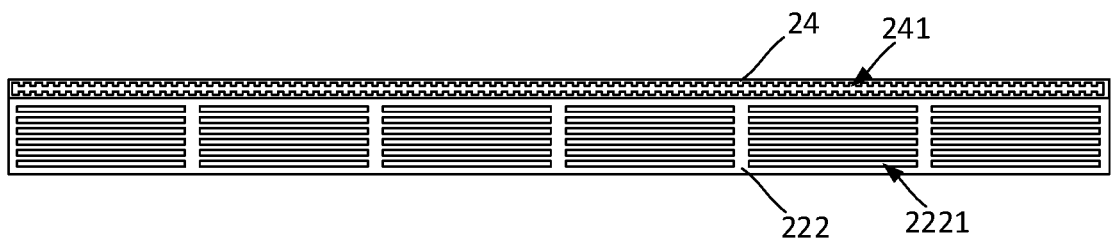
FIG. 5 is a schematic structural diagram of a diffuser plate of an air distributing box in the high-brightness liquid crystal display device according to the first embodiment of the present invention.

There are sequentially a liquid crystal panel, an optical diaphragm, a diffuser, and a lamp panel from the front surface to the back surface of the display module 21 of the present invention. The second ventilation channel is formed between the diffuser and the lamp panel. The third ventilation channel is formed between the optical diaphragm and the liquid crystal panel. In a specific embodiment of the present invention, as shown in FIG. 4 and FIG. 5, a diffuser plate 222 is disposed on the air distributing box 22. The diffuser plate 222 is disposed at the ventilation channel in a blocking manner. A plurality of communicating openings 2221 are formed on the diffuser plate 222.

The communicating openings 2221 formed on the diffuser plate 222 may facilitate uniform distribution of the airflow. The airflow in the ventilation channel of the air distributing box 22 may be distributed to each region through the communicating openings 2221 in the diffuser plate 222, thereby further reducing vibration of the diaphragm inside the display module 21 by the airflow and reducing influence on the display effect.

In a preferred embodiment, the diffuser plate 222 is disposed at a top of the air distributing box 22.

In another preferred embodiment, the diffuser plate 222 is disposed at an upper portion of the air distributing box 22.

In a first embodiment, as shown in FIG. 5, the communicating opening 2221 in the diffuser plate 222 is shaped into a strip hole, and a plurality of strip holes are arranged on the diffuser plate 222 at intervals.

Figure 6:
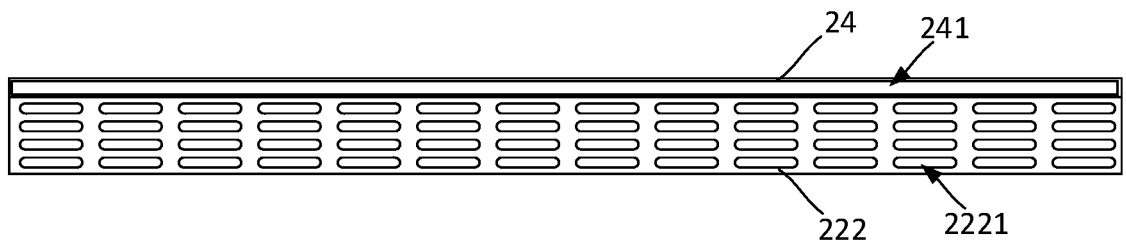
FIG. 6 is a schematic structural diagram of a diffuser plate of the air distributing box in the high-brightness liquid crystal display device according to a second embodiment of the present invention.

In a second embodiment, as shown in FIG. 6, the communicating opening 2221 in the diffuser plate 222 is shaped into a waist-shaped hole, and a plurality of waist-shaped holes are arranged on the diffuser plate 222 at intervals.

Figure 7:
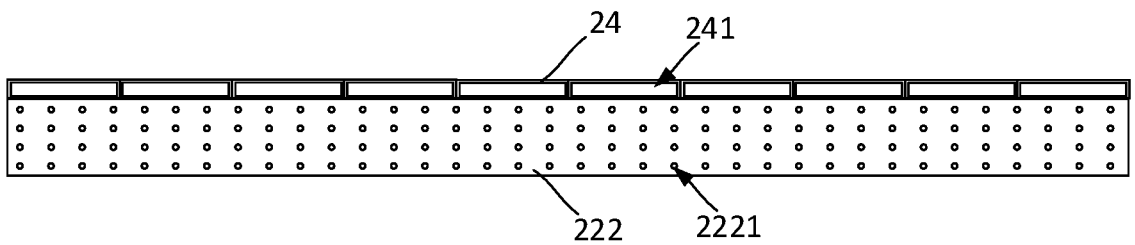
FIG. 7 is a schematic structural diagram of a diffuser plate of the air distributing box in the high-brightness liquid crystal display device according to a third embodiment of the present invention.

In a third embodiment, as shown in FIG. 7, the communicating opening 2221 in the diffuser plate 222 is shaped into a round hole, and a plurality of round holes are arranged on the diffuser plate 222 at intervals.

As shown in FIG. 1, the ventilation opening 211 formed at the side portion of the display module 21 may also be a strip hole, a waist-shaped hole, or a round hole, and may be formed opposite to the communicating opening 2221 in the diffuser plate 222.

Further, a size of the diffuser plate 222 is adapted to that of the air distributing box 22. The air distributing box 22 is a hollow square box with the air duct formed inside. The diffuser plate 222 is a square plate connected to a side box plate of the air distributing box 22.

In a specific embodiment of the present invention, as shown in FIG. 4, a partition plate 224 is disposed in the air distributing box 22. The air duct is partitioned by the partition plate 224 to form two sub air ducts 225. The two sub air ducts 225 are respectively communicated with the second ventilation channel and the third ventilation channel.

As shown in FIG. 4, the display device further includes a filter 221. The filter 221 is disposed in the air distributing box 22. The filter 221 is disposed at the air duct in a blocking manner, to filter air that flows through the air duct.

The partition plate 224 is erected above the filter 221. The partition plate 224 is connected to two opposite side box plates of the air distributing box 22, to partition the air duct above the filter 221 to form the two sub air ducts 225.

In a specific embodiment of the present invention, as shown in FIG. 4, the diffuser plate 222 is disposed on the air distributing box 22. The diffuser plate 222 is disposed at the sub air duct 225 in a blocking manner. A plurality of communicating openings communicated with the second ventilation channel and/or the third ventilation channel are formed on the diffuser plate 222.

Figure 9:
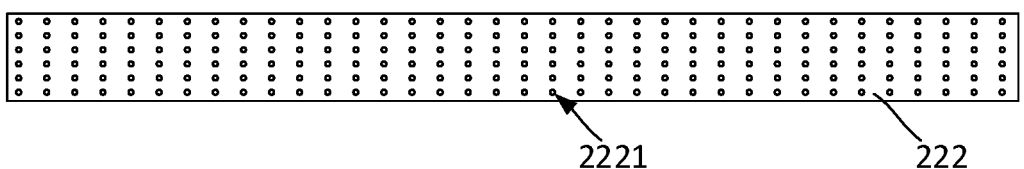
FIG. 9 is a schematic structural diagram of a diffuser plate of the air distributing box in the high-brightness liquid crystal display device according to a fourth embodiment of the present invention.

As shown in FIG. 9, the communicating openings 2221 formed on the diffuser plate 222 spread all over the diffuser plate 222. The communicating opening 2221 may communicate the second ventilation channel and the third ventilation channel, such that airflows are formed in both the second ventilation channel and the third ventilation channel to implement temperature reduction or temperature increase treatment on the interior of the display module 21.

In another preferred embodiment, the communicating opening 2221 formed on the diffuser plate 222 corresponds to a position of the second ventilation channel, such that the third ventilation channel is closed and not communicated with the outside. In this way, the fan may form an airflow in the second ventilation channel to implement temperature reduction or temperature increase treatment. Preferably, a baffle plate may be disposed on the diffuser plate 222. The baffle plate blocks the communicating opening communicated with the third ventilation channel, thereby closing the third ventilation channel.

In still another preferred embodiment, the communicating opening 2221 formed on the diffuser plate 222 corresponds to a position of the third ventilation channel, such that the second ventilation channel is closed and not communicated with the outside. In this way, the fan may form an airflow in the third ventilation channel to implement temperature reduction or temperature increase treatment. Preferably, a baffle plate may be disposed on the diffuser plate 222. The baffle plate blocks the communicating opening communicated with the second ventilation channel, thereby closing the second ventilation channel.

In a specific embodiment of the present invention, as shown in FIG. 4, a static pressure cavity 223 is formed in the air distributing box 22. As shown in FIG. 2 and FIG. 3, the airflow formed by the fan 23 flows through the static pressure cavity 223, and then flows through the filter 221. Preferably, the static pressure cavity 223 is formed at a lower portion of the air distributing box 22.

The static pressure cavity 223 is a closed cavity. The static pressure cavity is communicated with the fan 23. The fan 23 may deliver the air into the static pressure cavity 223 of the air distributing box. A flow velocity of the air decreases in the static pressure cavity 223, which increases static pressure. The static pressure may make the air flow to the diffuser plate more uniformly and further distributed to different air outlets.

In a specific embodiment of the present invention, as shown in FIG. 1 to FIG. 3, the temperature controller 24 is a temperature control frame. The first ventilation channel 241 through which the airflow passes is formed inside the temperature control frame.

In the first embodiment, as shown in FIG. 5, two side frame plates of the temperature control frame are uneven corrugated plates, which may enlarge a contact area, thereby improving heat exchange effect.

In the second embodiment, as shown in FIG. 6, the temperature control frame is a square frame with openings at the top and the bottom. The first ventilation channel is communicated with the outside through the openings.

In the third embodiment, as shown in FIG. 7, the temperature control frame is a square frame with a plurality of baffle plates disposed inside. The first ventilation channel 241 is partitioned by the baffle plates to form a plurality of sub-channels.

Furthermore, as shown in FIG. 3, the top and the bottom of the temperature controller are flush with those of the corresponding air distributing box 22. A side portion of the temperature controller 24 corresponding to a direction in which the first ventilation channel 241 is formed protrudes from the display module 21 to form a protruding section. The air distributing box 22 abuts the protruding section.

Figure 8:
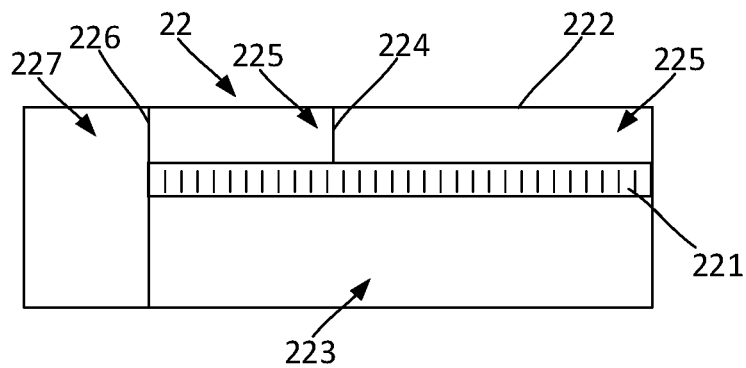
FIG. 8 is a sectional view of the air distributing box in the high-brightness liquid crystal display device according to the second embodiment of the present invention.

In a specific embodiment of the present invention, as shown in FIG. 8 and FIG. 11, the air distributing box 22 is also disposed at a side portion corresponding to the temperature controller 24. The air duct in the air distributing box 22 is communicated with the first ventilation channel of the temperature controller 24.

An isolation baffle plate 226 is disposed inside the air distributing box 22. The isolation baffle 226 plate partitions the interior of the air distributing box 22 to form sub air ducts 227 communicated with the temperature controller 24. The filter 221 is erected on isolation baffle plate 226 and a corresponding side box plate of the air distributing box 21.

Figure 10:
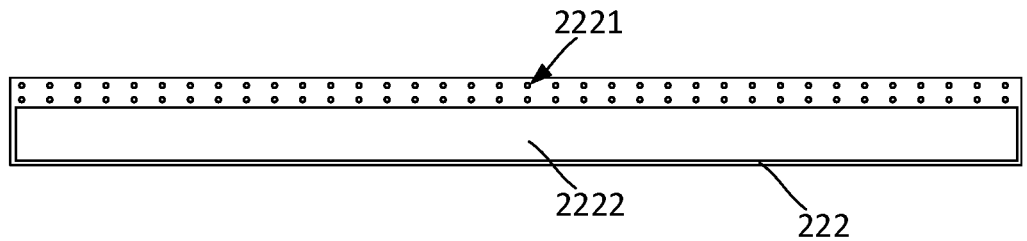
FIG. 10 is a schematic structural diagram of the diffuser plate of the air distributing box in the high-brightness liquid crystal display device according to a fifth embodiment of the present invention.

As shown in FIG. 9 and FIG. 10, the ventilation opening 2221 formed on the diffuser plate 222 on the air distributing box 22 is communicated with the sub air duct 227. When the second ventilation channel and the third ventilation channel are required to be closed, a baffle plate 2222 is disposed on the diffuser plate 222 to block the communicating openings corresponding to the second ventilation channel and the third ventilation channel.

In a specific embodiment of the present invention, as shown in FIG. 1, there are a plurality of ventilation openings 211. A length of the air distributing box 22 is adapted to that of the corresponding side portion of the display module 21.

The ventilation opening 211 may be formed at a side portion of the display module 21 in a width direction, or may be formed at a side portion of the display module 21 in a length direction. The display module 21 may be a vertical display structure or a transverse display structure.

In an example shown in FIG. 1, the display module 21 is the vertical display structure. The ventilation openings 211 are formed on the top and the bottom of the display module 21. The air distributing box 22 and the fan 23 are both mounted to the top and the bottom of the display module 21. As shown in FIG. 2, the formed airflow flows from the bottom to the top of the display module 21.

In the second embodiment of the present invention, as shown in FIG. 8 and FIG. 11, a size of the temperature controller 24 disposed on the back of the display module 21 is adapted to that of the display module 21. A width of the air distributing box 22 is equal to a sum of widths of the display module 21 and the temperature controller 24.

Figure 12:
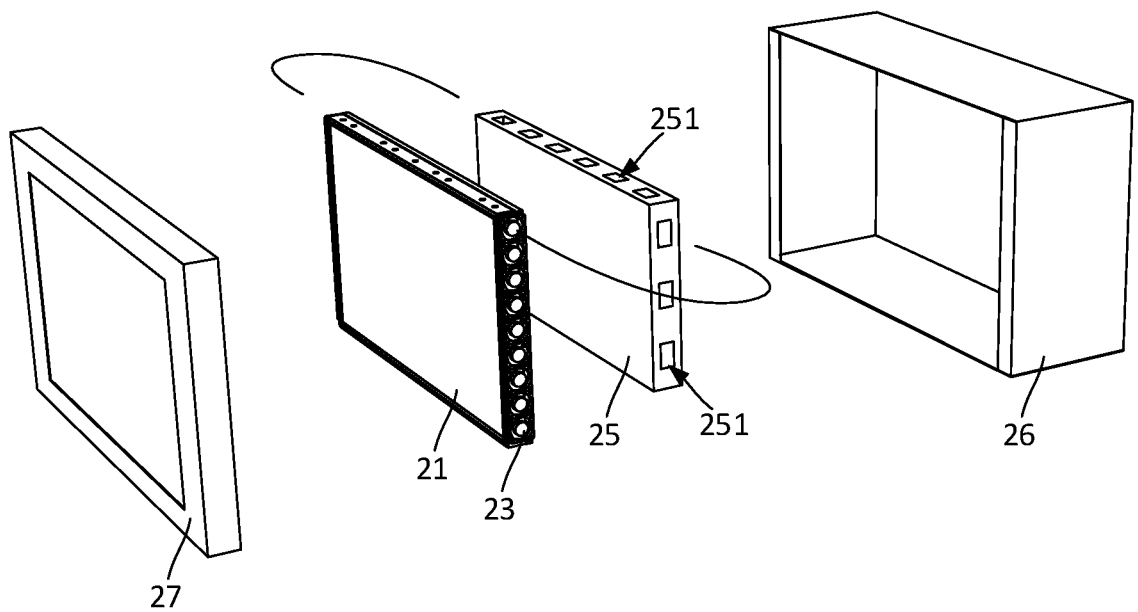
FIG. 12 is an exploded schematic structural diagram of the high-brightness liquid crystal display device according to the third embodiment of the present invention.

As shown in FIG. 12, in a specific embodiment of the present invention, the display device further includes a thermostatic structure 25. The thermostatic structure 25 and the display module 21 are packaged in a closed shell 26. A glass cover plate 27 is disposed on the closed shell 26 in correspondence to a picture display side of the display module 21.

A plurality of thermostatic channels 251 are formed in the thermostatic structure 25. The thermostatic structure 25 implements temperature increase or temperature reduction treatment on an airflow that flows through the thermostatic channel. The plurality of thermostatic channels 251 are transversely and vertically formed in the thermostatic structure 25.

The display module 21 in FIG. 12 is the transverse display structure. The air distributing box and the fan are disposed on both sides of the display module in a transverse direction. The airflow in the display module flows in left-right directions. The airflow also flows through the corresponding thermostatic channel 251 in the thermostatic structure 25 in the left-right directions. If the temperature of the display module 21 is required to be reduced, the thermostatic channel 251 may reduce the temperature of the airflow, such that the airflow cools the interior of the display module 21. If the temperature of the display module 21 is required to be increased, the thermostatic channel 251 may increase the temperature of the airflow, such that the airflow increases the temperature inside the display module 21.

Figure 13:
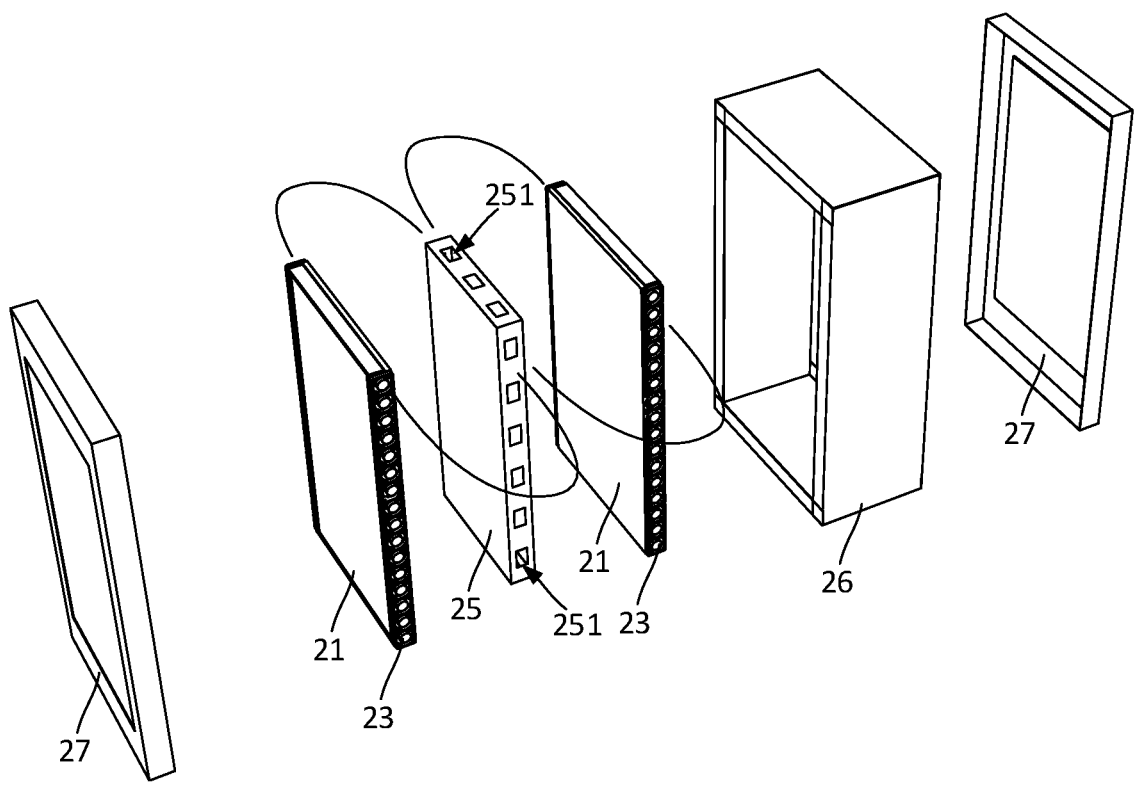
FIG. 13 is an exploded schematic structural diagram of the high-brightness liquid crystal display device according to the fourth embodiment of the present invention.

As shown in FIG. 13, which shows a structure of another embodiment. In this embodiment, there are two display modules 21. The two display modules 21 are connected back to back. The thermostatic structure 25 is disposed between the two display modules 21. Glass cover plates 27 are disposed on front and rear sides of the closed shell 26 in correspondence to picture display sides of the display modules 21.

The display device of the present invention may be selected based on an environment of a place where the display device is used. When an environmental temperature of the place where the display device is used is appropriate, the second ventilation channel and the third ventilation channel inside the display module of the display module may both be closed, and only the first ventilation channel is used to adjust the temperature of the display module. When the environmental temperature of the place where the display device is used is extreme, for example, in a high-temperature or low-temperature environment, the second ventilation channel and/or the third ventilation channel inside the display module may be selected to be opened.

The present invention has the following beneficial effects.

The temperature controller is disposed on a back surface of the lamp panel of the display module. During cooling, cold air may quickly enter the display module and reach the back to effectively take away heat generated by the lamp panel, thereby implementing efficient self-cooling effect. During heating, hot air may quickly enter the display module and reach the back to effectively increase the temperature of the lamp panel, such that the lamp panel works at an appropriate environmental temperature.

The influence of the air on the display effect is reduced. The static pressure cavity is formed in the air distributing box. When the air enters the static pressure cavity, the flow velocity of the air decreases, which increases the static pressure of the static pressure cavity. The increased static pressure may make the air flow to the diffuser plate more uniformly and distributed to different air outlets. The diffuser plate may maximally reduce the influence of the air entering the display module on a display picture. A plurality of air outlets are formed on the diffuser plate. The air entering the diffuser plate through the static pressure cavity is distributed to each region through the air outlets in the diffuser plate.

The display effect is improved. With the foregoing structural design, the temperature inside the display module may be quickly adjusted, light leakage may be reduced, and the display effect may be improved. The temperature inside the display module is adjusted, thereby effectively prolonging a service life of a product. At a low temperature, a lightemitting diode (LED) is higher in photoelectric conversion efficiency. At the low temperature, the LED, the optical diaphragm, and a liquid crystal display (LCD) are lower in aging and longer in service life.

The above describes the present invention in detail with reference to the accompanying drawings and the embodiments. An ordinary person skilled in the art may make various variations to the present invention based on the foregoing description. Therefore, some details in the embodiments shall not form limitations on the present invention. The present invention uses the scope defined by the appended claims as the protection scope of the present invention.

What is claimed is:

1. A high-brightness liquid crystal display device, comprising:
   a display module;
   a temperature controller abutting a back surface of the display module, a first ventilation channel being formed in the temperature controller;
   fans disposed on the display module in correspondence to the first ventilation channel of the temperature controller, the fans forming an airflow that flows through the first ventilation channel, to adjust the temperature of the display module and
   air distributing boxes connected to a side portion of the display module and corresponding to the fans such that the airflow from the fans to the display module is slowed down and influence to the display module caused by the airflow of the fans is reduced.

2. The high-brightness liquid crystal display device according to claim 1, wherein ventilation openings communicated with an interior of the display module are formed on two opposite sides of the display module; and
   and an air duct is formed inside the air distributing box.

3. The high-brightness liquid crystal display device according to claim 2, wherein a second ventilation channel close to the back surface and a third ventilation channel close to a front surface are formed in the display module; and
   the second ventilation channel and the third ventilation channel are both communicated with the ventilation openings.

4. The high-brightness liquid crystal display device according to claim 3, wherein a diffuser plate is disposed on the air distributing box, the diffuser plate is disposed at the ventilation channel in a blocking manner, and a plurality of communicating openings are formed on the diffuser plate.

5. The high-brightness liquid crystal display device according to claim 3, wherein a partition plate is disposed in the air distributing box, and the air duct is partitioned by the partition plate to form sub air ducts correspondingly communicated with the second ventilation channel and the third ventilation channel.

6. The high-brightness liquid crystal display device according to claim 5, wherein the diffuser plate is disposed on the air distributing box, the diffuser plate is disposed at the sub air duct in a blocking manner, and a plurality of communicating openings communicated with the second ventilation channel and/or the third ventilation channel are formed on the diffuser plate.

7. The high-brightness liquid crystal display device according to claim 2, wherein a static pressure cavity is formed in the air distributing box; and
   the airflow formed by the fan flows through the static pressure cavity, and then flows into the air duct.

8. The high-brightness liquid crystal display device according to claim 2, wherein the air distributing box is also disposed at a side portion corresponding to the temperature controller, and the air duct in the air distributing box is communicated with the first ventilation channel of the temperature controller.

9. The high-brightness liquid crystal display device according to claim 2, wherein a side portion of the temperature controller corresponding to a direction in which the first ventilation channel is formed protrudes from the display module to form a protruding section; and
   the air distributing box abuts the protruding section.

10. The high-brightness liquid crystal display device according to claim 1, further comprising a thermostatic structure, wherein the thermostatic structure and the display module are packaged in a closed shell; and
    a plurality of thermostatic channels are formed in the thermostatic structure, and the thermostatic structure implements temperature increase or temperature reduction treatment on an airflow that flows through the thermostatic channel.

* * * * *